(12) United States Patent
Brewer et al.

(10) Patent No.: US 10,546,186 B2
(45) Date of Patent: Jan. 28, 2020

(54) OBJECT TRACKING AND BEST SHOT DETECTION SYSTEM

(71) Applicant: AVIGILON FORTRESS CORPORATION, Vancouver (CA)

(72) Inventors: Paul C. Brewer, Arlington, VA (US); Dana Eubanks, Herndon, VA (US); Himaanshu Gupta, Herndon, VA (US); W. Andrew Scanlon, Falls Church, VA (US); Peter L. Venetianer, McLean, VA (US); Weihong Yin, Great Falls, VA (US); Li Yu, Sterling, VA (US); Zhong Zhang, Great Falls, VA (US)

(73) Assignee: AVIGILON FORTRESS CORPORATION, Vancouver, British Columbia (CA)

( * ) Notice: Subject to any disclaimer, the term of this patent is extended or adjusted under 35 U.S.C. 154(b) by 4 days.

(21) Appl. No.: 15/842,925

(22) Filed: Dec. 15, 2017

(65) Prior Publication Data

US 2019/0057250 A1 Feb. 21, 2019

Related U.S. Application Data

(60) Continuation of application No. 14/884,778, filed on Oct. 16, 2015, now Pat. No. 9,858,474, which is a division of application No. 13/804,280, filed on Mar. 14, 2013, now Pat. No. 9,195,883.

(60) Provisional application No. 61/621,703, filed on Apr. 9, 2012.

(51) Int. Cl.
*G06K 9/00* (2006.01)

(52) U.S. Cl.
CPC ..... *G06K 9/00302* (2013.01); *G06K 9/00295* (2013.01); *G06K 9/00771* (2013.01)

(58) Field of Classification Search
CPC .......... G06K 9/00302; G06K 9/00295; G06K 9/00771
See application file for complete search history.

(56) References Cited

U.S. PATENT DOCUMENTS

| | | |
|---|---|---|
| 5,802,220 A | 9/1998 | Black et al. |
| 7,522,186 B2 | 4/2009 | Arpa et al. |
| 7,932,923 B2 | 4/2011 | Lipton et al. |
| 8,073,206 B2 | 12/2011 | Kamiyama et al. |
| 8,087,021 B1 * | 12/2011 | Holdman ............ G06F 9/45533 711/6 |
| 8,139,817 B2 | 3/2012 | Laganière et al. |
| 2006/0182310 A1 | 8/2006 | Neuhaus |

(Continued)

FOREIGN PATENT DOCUMENTS

| | | |
|---|---|---|
| JP | 2005-227957 A | 8/2005 |
| JP | 4316541 B2 | 8/2009 |
| WO | WO 2012/161584 A1 | 11/2012 |

OTHER PUBLICATIONS

Heath et al, "Facenet: Tracking People and Acquiring Canonical Face Images in a Wireless Camera Sensor Network". IEEE, 2007.

(Continued)

*Primary Examiner* — Siamak Harandi
(74) *Attorney, Agent, or Firm* — Muir Patent Law, PLLC

(57) ABSTRACT

A method and system using face tracking and object tracking is disclosed. The method and system use face tracking, location, and/or recognition to enhance object tracking, and use object tracking and/or location to enhance face tracking.

15 Claims, 5 Drawing Sheets

(56) References Cited

U.S. PATENT DOCUMENTS

2008/0267458 A1  10/2008  Laganiere et al.
2010/0232643 A1   9/2010  Chen et al.

OTHER PUBLICATIONS

Song et al, "Distributed Wide Area Scene Analysis in Reconfigurable Camera Networks". University of California.
Wang et al, "Cooperative Object Tracking and Composite Event Detection with Wireless Embedded Smart Cameras", Oct. 2010, IEEE Transaction on Image Processing, vol. 19, No. 10, pp. 2614-2633.

* cited by examiner

OBJECT TRACKING AND BEST SHOT DETECTION SYSTEM

CROSS-REFERENCE TO RELATED APPLICATIONS

This application claims priority to and is a continuation application of U.S. application Ser. No. 14/884,778, filed Oct. 16, 2015, which claims priority to and is a divisional application of U.S. application Ser. No. 13/804,280, filed Mar. 14, 2013, which claims priority under 35 U.S.C. 119(e) to U.S. Provisional Application No. 61/621,703, filed Apr. 9, 2012, the contents of each of which are incorporated by reference herein in their entirety.

BACKGROUND

Tracking people and other objects for video surveillance or other purposes is becoming more widespread across various industries. However, to reliably track a person across a wide area often runs into various problems, such as lack of camera coverage for the entire path, lost tracking in a camera view due to object occlusions, or lost tracking from one camera view to a different camera view etc. The disclosed embodiments use a combination of face detection, face tracking, and face recognition, in a human tracking system, to better count and track people at a particular location. Various methods and devices for performing improved human tracking are described herein.

SUMMARY

In one embodiment, a method of automatically tracking a target is disclosed. The method includes: using an object tracking process to track a first object corresponding to a first target during a first period of time; capturing a first face image of the first object at a first time during the first period of time; storing the first face image of the first object at a computer system, and associating the first face image with the first target; capturing a second face image at a second time during the first period of time, the second face image corresponding in space with the tracked first object; comparing the second face image to the first face image to determine whether the second face image and the first face image correspond to the same target; and when the second face image and first face image are determined to correspond to the same target, confirming that the first target still corresponds to the first object.

In another embodiment, a method of automatically tracking a target by a video surveillance system is disclosed. The method includes: storing a best face image for a target, and tracking the target, wherein the best face image is automatically determined to be a best face image from a group of images; detecting an event associated with the target, wherein during the event, a face image for the target is not visible or is not recognizable; storing a record of the event; and associating the best face image for the target with the event.

In one embodiment, a system for automatically tracking a target at a facility includes one or more image capture devices, and a computer system including one or more computer readable storage media. The computer system including one or more computer readable storage media is configured to: use an object tracking process to track a first object during a first period of time, the first object captured by the one or more image capture devices; store a first face image of the first object, the first face image captured by the one or more image capture devices at a first time during the first period of time; associate the first face image with the first target; receive a second face image captured by the one or more image capture devices at a second time during the first period of time, the second face image corresponding in space with the tracked first object; compare the second face image to the first face image to determine whether the second face image and the first face image correspond to the same target; and when the second face image and first face image are determined to correspond to the same target, confirm that the first target still corresponds to the first object.

An exemplary video surveillance system for automatically tracking a target is also disclosed herein. The system includes one or more image capture devices, and a computer system including one or more computer readable storage media configured to: store a best face image for a target, and track the target, based on images captured from the one or more image capture devices, wherein the best face image is automatically determined to be a best face image from a group of images; detect an event associated with the target, wherein during the event, a face image for the target is not visible or is not recognizable; store a record of the event; and associate the best face image for the target with the event.

In one embodiment, a method of tracking a face is disclosed. The method is performed by a computer system, and includes: tracking a face target; tracking an object associated with the face target; receiving an actual face image during a video frame; and verifying, based on a location of the face and a most recent location of the tracked object, whether the actual face image corresponds to the face target In yet another embodiment, a method of tracking one or more targets using object tracking and face tracking is disclosed. The method includes: automatically tracking a first target by performing object tracking on a first object using a first image capture device; automatically tracking a face of the first target using the image capture device, thereby performing face tracking; and after a period of tracking the first object as the first target, verifying that the first target still corresponds to the first object, based on a combination of the object tracking and the face tracking.

DETAILED DESCRIPTION

Figure 1:
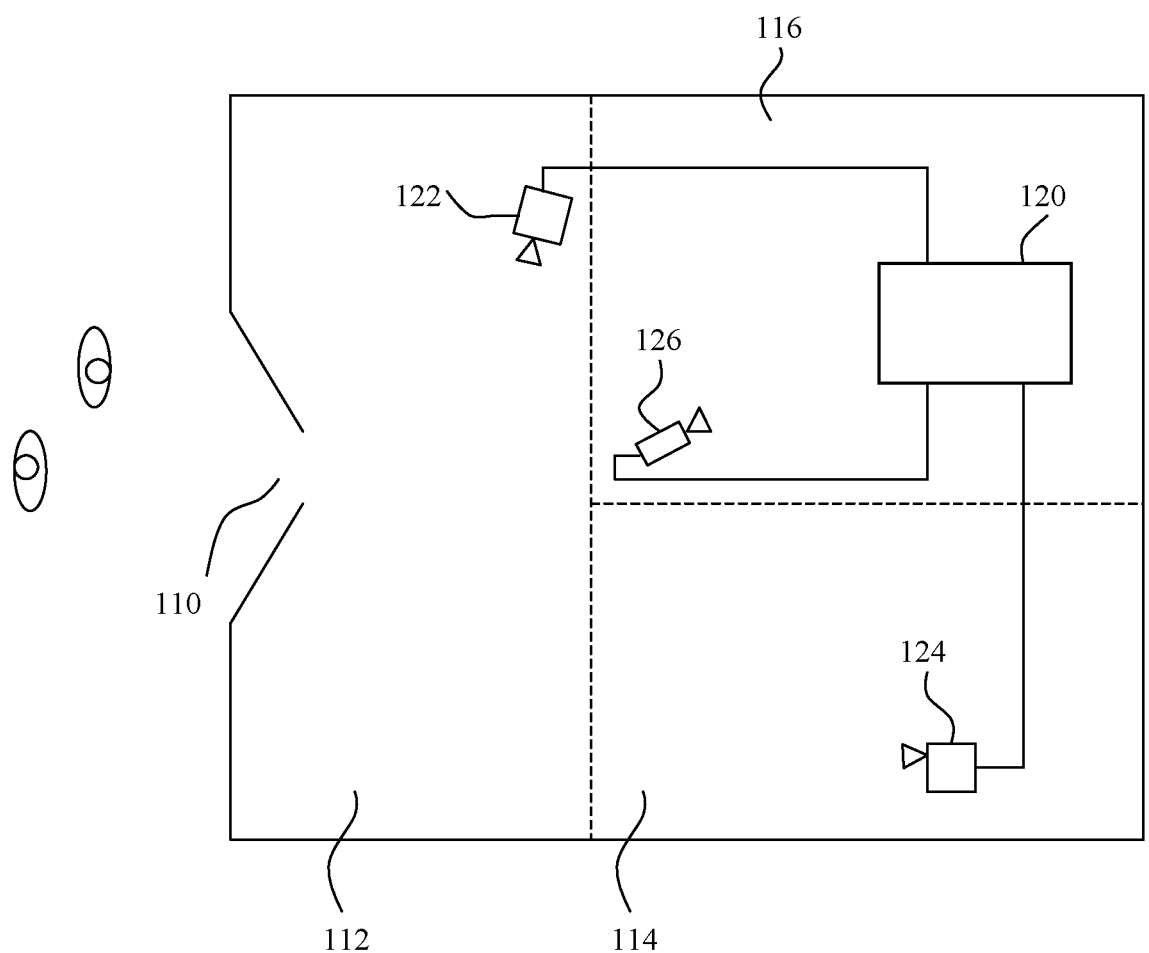
FIG. 1 is an illustration of an exemplary facility and system for performing tracking, according to one exemplary embodiment.

The present disclosure now will be described more fully hereinafter with reference to the accompanying drawings, in which various embodiments are shown. The invention may, however, be embodied in many different forms and should not be construed as limited to the embodiments set forth herein. In the drawings, the size and relative sizes of layers and regions may be exaggerated for clarity. Like numbers refer to like elements throughout.

It will be understood that when an element is referred to as being "connected" or "coupled" to or "on" another element, it can be directly connected or coupled to or on the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. Unless indicated otherwise, these terms are only used to distinguish one element from another. For example, a first chip could be termed a second chip, and, similarly, a second chip could be termed a first chip without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Embodiments described herein will be described referring to plan views and/or cross-sectional views by way of ideal schematic views. Accordingly, the exemplary views may be modified depending on manufacturing technologies and/or tolerances. Therefore, the disclosed embodiments are not limited to those shown in the views, but include modifications in configuration formed on the basis of manufacturing processes. Therefore, regions exemplified in figures have schematic properties, and shapes of regions shown in figures exemplify specific shapes of regions of elements, and the specific properties and shapes do not limit aspects of the invention.

Spatially relative terms, such as "beneath," "below," "lower," "above," "upper" and the like, may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

Terms such as "same," "planar," or "coplanar," as used herein when referring to orientation, layout, location, shapes, sizes, amounts, or other measures do not necessarily mean an exactly identical orientation, layout, location, shape, size, amount, or other measure, but are intended to encompass nearly identical orientation, layout, location, shapes, sizes, amounts, or other measures within acceptable variations that may occur, for example, due to manufacturing processes.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

I. Tracking Systems

Systems currently exist for tracking objects and people captured in video images. An exemplary system is described in U.S. Pat. No. 7,932,923, issued on Apr. 26, 2011 (the '923 patent), the entire contents of which are incorporated herein by reference. As an example, a video system can be set up in a shopping center, and based on certain computer programs and algorithms, people's movements can be tracked. For example, certain aisles in the shopping center, or certain shelves can be observed using known object tracking algorithms, and a number of people and/or average amount of time spent by those people at those aisles and shelves can be obtained and analyzed. In addition, an individual person can be tracked, such that the surveillance system logs the person's actions, such as the person walking into a certain area in the shopping center, lingering there for a period of time, and then walking to a different area in the store.

In one embodiment, face detection, face tracking, and face recognition are used to enhance existing tracking systems. For example, when an object is being tracked, the tracking system can store various metadata about the object, such as a classification (e.g., person, vehicle, animal, etc.), a color, a size, etc. In one embodiment, for objects identified by an object tracking process as people, image information associated with the people is stored. The image information may include, for example, an image of the person such as the person's face, and/or may also include descriptive information about the person's face based on the image (e.g., image metadata such as skin tone, shape, pixel arrangements, etc.). Image information may also include analysis data about the image, as discussed further below. By using this information, the tracking of particular individuals throughout a facility, as well as other features, such as security and marketing, can be improved.

In certain embodiments, object tracking, for example, of people, and face tracking and/or face recognition are used together to better track the objects in a video scene. For example, as described further below, in one embodiment, an object tracking process tracks a first object corresponding to a first target, and face recognition may be used during the tracking to confirm whether the object tracking process is correctly tracking the first target. In other embodiments, a face tracking process may be used to track a target, and an object tracking process may be used to confirm that the face tracking is still tracking the correct target. In still further embodiments, both object tracking and face tracking are carried out on a same target, and are compared spatially to verify that the tracking is correct. In additional embodiments, a best face image of a person's face is determined, and this best face image may be used as an index to supplement tracking of the person. These, and various other embodiments are described below.

FIG. 1 illustrates an exemplary system for performing face detection and tracking in accordance with certain disclosed embodiments. As shown in FIG. 1, a facility 100 may include a choke point 110, a plurality of sections 112, 114, and 116, a computer system 120, and a plurality of image capture devices 122, 124, and 126.

The facility 100 may include any facility where people or other target objects to be tracked (e.g., vehicles, animals) are expected to be present. For example, facility 100 could be a retail store, a transportation vehicle or facility, a sports arena, a casino, etc. The facility 100 may have a plurality of sections, for example, sections 112, 114, 116. Each section may be, for example, a different room or area within the facility. Certain desired sections include image capture devices, such as devices 122, 124, and 126. The image capture devices can include digital or analog cameras including image-capturing hardware, such as lenses, image sensors such as CMOS sensors, microprocessors, memory chips, other circuitry, and image processing software. The image capture devices may include other known components as well. In one embodiment, the image capture devices include hardware and software for performing analysis on collected data, such as video content analysis (VCA). As one example, a video capture device may include a video sensor, such as a camera, which may be optionally connected to a video recorder, such as a digital video recorder (DVR) or a network video recorder (NVR). The video recorder may be programmed to perform certain analysis.

The facility 100 may include a computer system 120 for storing and processing data collected by the image capture devices 122, 124, and 126. The computer system may include one or more servers, mainframe computers, or other computers, configured to perform the processes described herein. In addition, in certain embodiments, the computer system 120 may include computers embedded in the image capture devices 122, 124, and 126 or in the image storage devices (e.g., a DVR or NVR maybe considered to be part of the computer system 120). Each computer may include hardware, such as central processing units, memory, and I/O interfaces, and other known components, and software. The hardware and software may comprise computer-readable media (e.g., storing data and/or program code) configured and programmed to perform one or more of the methods disclosed herein. The different devices of computer system 120 are communicatively connected (e.g., via wired or wireless communication media) to the image capture devices 122, 124, and 126, and may be connected to other devices within the facility. Where computers or other processing devices are embedded in the image capture devices 122, 124, and 126, the image capture devices may be integrated with those computers or devices, and typical wired or wireless network connections may not be necessary. An exemplary facility, computer system, and surveillance system are further described in the '923 patent.

In one embodiment, each image capture device can store captured images and/or analyze the images to create analysis data. One or more of the image capture devices may include, for example, video recorders, VCA hardware and software, and image sensors integrated into a single physical device. These image capture devices can then communicate their captured image information (including, for example, images, image metadata about the images, and/or analysis data) to a more central computer at the facility. In one embodiment, the central computer then stores the captured information in a central database.

In an alternative embodiment, instead of or in addition to a computer system 120 located at the facility, other computers external to the facility can be used to store certain information. For example, an external computer outside the facility, such as a server on the Internet, or at another nearby facility, can store the captured image information.

II. Face Detection

A face detection software program included in equipment attached to the image capture devices 122, 124 and/or 126, and/or included in computer system 120 (or an external system) may analyze received video frames and use the analyzed information and optional camera calibration information to determine potential faces in each video frame based on certain applied algorithms. Note that the term "face detection" used herein refers to determining whether a face is present (e.g., human face, animal face, or other target face), whereas "face recognition" refers to determining if a detected face corresponds to a particular target (e.g., a particular person), for example, by comparing with one or more reference faces.

For example, in one embodiment, for each frame captured by a camera, blobs may be detected. The blobs may be detected using, for example, one or more methods discussed in the '923 patent. The blobs may then be analyzed to search for and recognize skin tones, boundary edges of the blob or edges inside the blob, and/or certain types of pixel groupings that typically make up a face or part of a face. Calibration information may be used to determine a relative real-world size of a detected blob. The determined attributes (e.g., boundary edge shape, detected skin tone, real-world size, etc.) may then be used to determine whether the blob contains a face. For example, each attribute may be compared to one or more attributes stored in a database, in order to determine a likelihood that the attribute corresponds to a face. In certain embodiments, blob detection may be used to detect an object (e.g., a person), and then additional analysis may be performed on the blob, or a separate analysis may be performed, to detect a face. The face may be part of a blob that represents a person. In addition, the face may be separately analyzed as its own blob.

Figure 2:
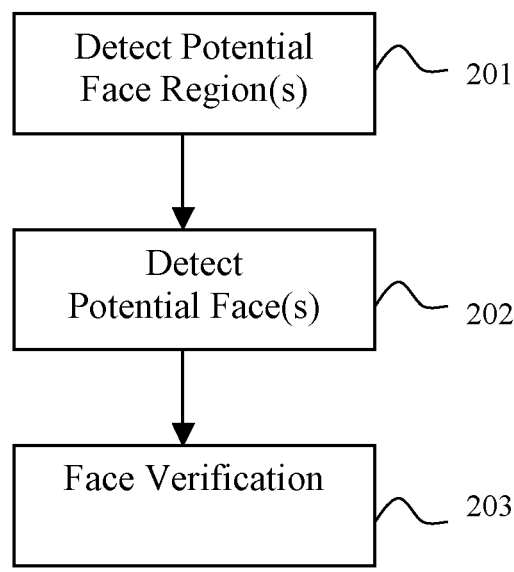
FIG. 2 is a flow chart depicting an exemplary face verification method, according to one exemplary embodiment.

An exemplary method 200 for determining if a potential (human) face blob contains an actual face is described in FIG. 2. As shown in FIG. 2, in a first step 201, one or more potential face regions are detected. For example, the image can be analyzed for pixels that correspond to skin tone, and/or for objects that resemble a typical shape of a human head. In a second step 202, each potential face region is further analyzed, in combination with an expected face size range based on the camera calibration. Existing face detection algorithms or programs can use information such as described above to determine if an object in an image is a face or not. Example algorithms and/or programs are described, for example, in the following publications: P. Viola, and M. Jones, "Rapid object detection using a boosted cascade of simple features," Proceedings, IEEE Conference on Computer Vision and Pattern Recognition, pages 511-518, 2001; H. Rowley, S. Baluja, and T. Kanade, "Neural network-based face detection," IEEE Pattern Analysis and Machine Intelligence, volume 20, pages 22-38, 1998; E. Osuna, R. Freund and F. Girosi, "Training support vector machines: an application to face detection," Proceedings, IEEE Conference on Computer Vision and Pattern Recognition, pages 130-136, 1997, which are incorporated herein by reference in their entirety. As a result, one or more potential faces are detected.

In step 203, face verification is performed. For example, the potential faces are verified as either faces or not faces. The verification accounts for various factors. For example, one factor may include the size of the potential face. Certain objects may be removed as potential faces if they are too big or too small. In addition, another factor may be whether a body or part of a body is associated with the detected potential face. For example, using a human tracking system that tracks bodies in general, a computer can determine whether the faces are associated based on their locations and/or orientation, such as spatial proximity, with an object such as body or at least an upper part of a body (e.g., a face image located above a torso portion of an object including the shape of a body may be determined to be associated with the object that includes the body). Using the body association information, the size information, and other relevant information, a computer can arrive at a more accurate determination of whether a potential face is an actual face. As such, the probability of correct face detection can be increased.

In one embodiment, the face detection is performed, and if a face is detected, then one or more images of the face are captured and stored, and may then be used for other applications, such as best shot detection, face recognition, and/or tracking. The entire images need not be transmitted from the image capture devices and stored. In one embodiment, certain processing can be performed at the image capture devices to determine and store analysis data about captured face images, such as the skin tone, certain facial features, etc. In one embodiment, only the analysis data is transmitted from the image capture devices, and the analysis data, instead of an actual image, is then stored (e.g., in a database and/or central computer at a facility) to be later used for other applications.

III. Face Tracking and Best Shot Detection

Figure 3A:
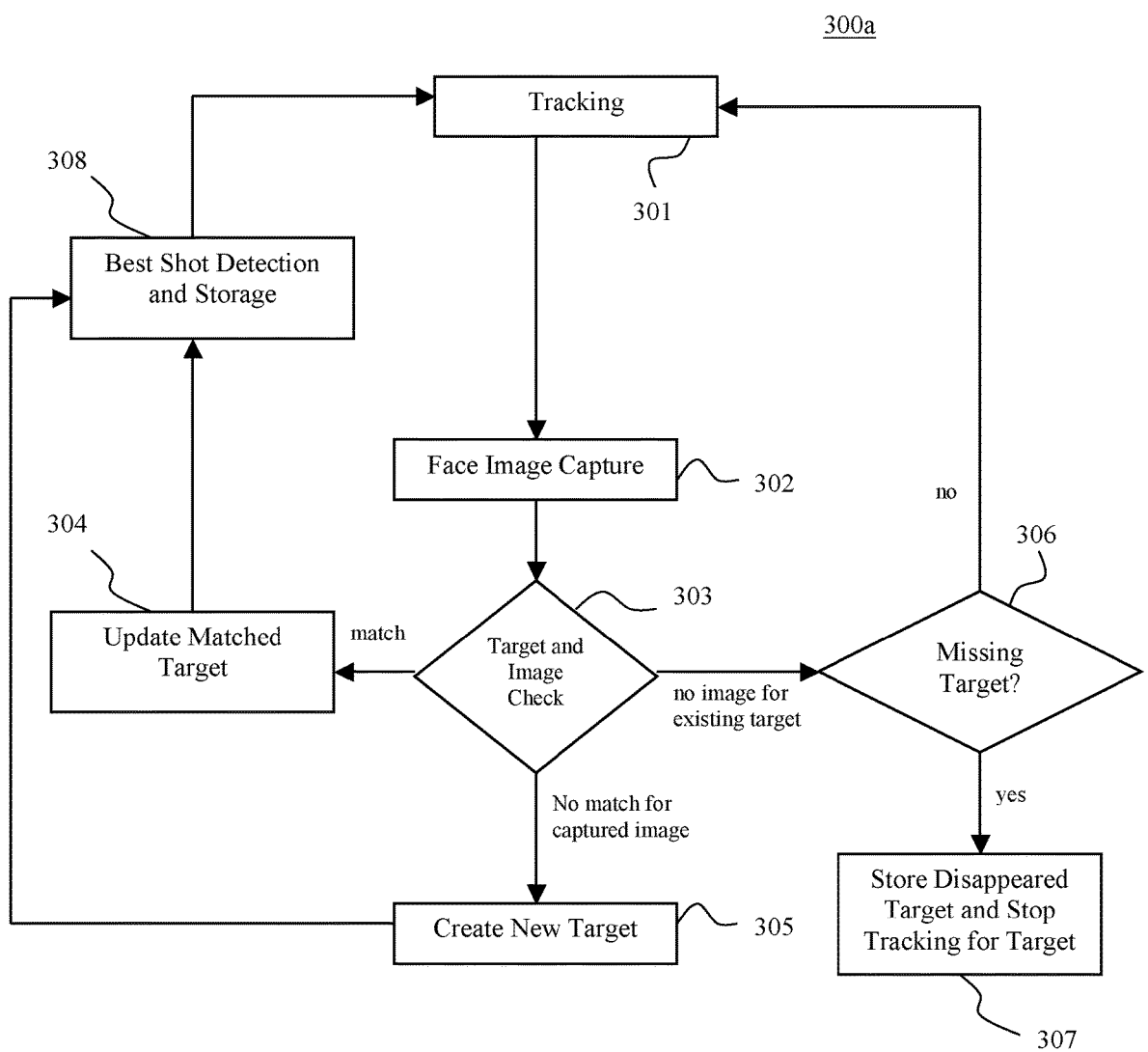
FIG. 3A is a flow chart depicting an exemplary tracking method, according to one exemplary embodiment.

FIG. 3A depicts an exemplary method 300 of tracking faces and detecting and storing a best shot associated with a tracked face, according to certain embodiments. As shown in FIG. 3A, in step 301, tracking for faces may be performed. The tracking may track one or more faces in a scene, using one or more tracking algorithms. Each tracked face is referred to as a face target. The tracking may be, for example, continuous tracking of a scene, and may include, for example, tracking in real-time.

The tracking may include, for example, tracking of multiple face targets in a video sequence. In an exemplary embodiment, each face snapshot may be modeled by an elliptical shaped convex image region. The properties of a face snapshot may include the image size and location, pixel color histograms, pixel edge gradient histograms, etc. In one embodiment, the process of tracking includes predicting a face snapshot of a particular face target in the next video frame based on the current target tracking data. The image location of the face can be estimated by the previous location and image moving velocity, the size of the face can be adjusted according to the camera calibration data, for example, if the person is moving closer to the camera, the face area will grow larger. This initial prediction of the location and size may not be very accurate due to the variation of the human moving speed or changing pose etc. Thus further searching may be used to find the optimal location of the face. Color and edge gradient based matching may be used for this purpose. Starting with the initial location, a set of neighboring locations are tested. For each image location, a face snapshot model is generated and its color and gradient matching score compared to the previous face snapshot is computed. The final snapshot is the one with the highest matching score. One way to define the matching score is to use the color and gradient histogram correlations. The same tracking procedure may be performed on every tracked face target for a current input video frame, which yields an estimated face snapshot (also referred to as a predicted or expected face snapshot) for the next frame.

In one embodiment, when a face target is being tracked, an actual image of the face may be stored (e.g., at a central storage computer), and tracking algorithms may be used to both predict and verify a location of the face target. For example, as described above, based on one or more criteria, such as a speed, direction, color, edge gradient, etc., of a face target, the tracking system can estimate an expected face image (e.g., appearance) and location (collectively referred to as an expected, estimated, or predicted snapshot) for a next frame. As such, a face target's location as well as an expected face image can be predicted for a face target.

In step 302, one or more actual face snapshots are captured. This may occur, for example for a particular frame. After the one or more actual face images are captured, step 303 is performed, such that captured face targets are checked to determine if they match existing face targets, and existing face targets are checked to determine if their corresponding face images have been captured. For example, in one embodiment, during step 303, the estimated face snapshots for all the tracked face targets are compared with any actual face snapshots detected on that frame. If an actual face snapshot matches with an estimated face snapshot (step 303, match), the system is updated to reflect the received actual face snapshot (step 304). For example, the current received actual face snapshot may be stored in a storage, along with information related to time and location, velocity, etc. The current received actual face snapshot may also replace a previous most recently stored actual face snapshot.

If an actual face snapshot does not match with any estimated face snapshots (step 303, no match for captured image), then a new face target can be created (step 305) to begin tracking a new face. As a result, new information including an image of the face target and metadata about the image may be stored for tracking that face target.

In some cases, for one or more existing targets, no face image is received. For example, a face target may have turned his/her head, or the target's face may not otherwise appear in a frame if he/she left the scene. In one embodiment, a missing target check (step 306) is performed to determine if a target's face expected to be in a video scene is missing from the video scene. If so, a further check can be performed to determine if the face has not appeared for a predetermined period of time (e.g., 10 seconds, 30 seconds, 1 minute, 5 minutes, etc.), or otherwise appears to have left the scene. If that predetermined period of time has been reached and/or it is determined that the target has left the scene (step 306, yes), then the target may be logged and stored as a disappeared target (step 307), which may indicate for example that the target is no longer in the scene or is no longer in a camera's view. Tracking of that target may then terminate. Once disappeared, the face target, which includes one or more best shots, or best face images (described further below), may then be stored and used for various purposes in order to track and identify the person throughout the facility.

However, if the target is not determined to have disappeared (step 306, no), then tracking for that target continues. In one embodiment, to additionally verify whether a target whose face is not captured during one or more frames is still in the scene, object tracking of the target as a whole (e.g., of the person using human tracking processes) may be used to verify whether the target is still in the scene. For example, the face target can be tracked along with an object that corresponds to the target. If the face does not appear in one or more frames after a certain time period of tracking of target has occurred, the tracking system can verify whether the object (e.g., human) appears in a spatial area that corresponds to a location where the face should occur (e.g., a predicted face location). If so, then the tracking system can verify that the target is still being tracked, and can update a location of the target, even though the face may not be visible for those frames.

Figure 3B:
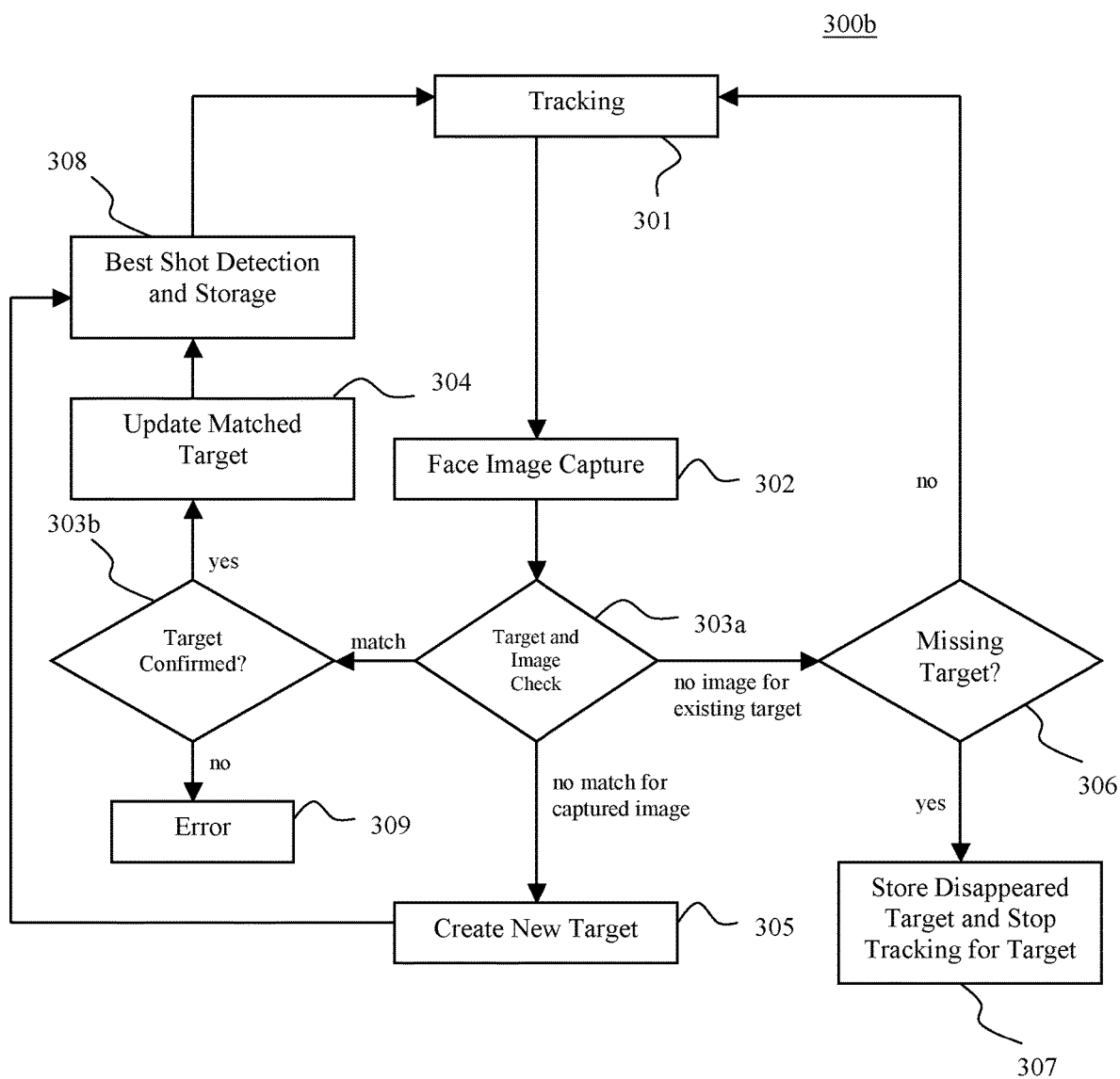
FIG. 3B is a flow chart depicting another exemplary tracking method, according to one exemplary embodiment.

FIG. 3B depicts another method 300*b* of tracking. In FIG. 3*b*, steps 301, 302, and 304-308 may be the same steps as in FIG. 3A. However, FIG. 3B includes a varied step 303 (shown as 303*a* and 303*b*), as well as an additional step 309. In step 303*a*, each captured actual image is compared with stored target images to determine if there is a match. If there is no match, then step 305 occurs as in FIG. 3*a*. However, if there is a match, then a confirmation step occurs (step 303*b*), where it is determined if the snapshot for that target matches an estimated snapshot for the target. If so, then step 304 occurs as in FIG. 3*a*. However, if not, an error may be logged (step 309).

In either embodiment shown in FIG. 3*a* or FIG. 3*b*, after step 304 or 305, when either a new target is created, or when an existing target is updated—the actual captured image can be analyzed for best shot detection (step 308).

As described below, in certain embodiments, for a particular video camera capturing a particular face at a given time period, a best shot, or best face image, can be determined from among the series of frames. A best shot is the best image representation of the face for that face target. It may represent a best focused image compared to other stored images for the face target, a least blurred image, an image taken from the closest angle as straight on, a most light-balanced image, or a combination of these or other criteria that can be used to determine the quality of an image. The best shot may depend on the situation. Accordingly, the system may use one or more features and attributes, including, but not limited to focus, motion blur, lighting, lack of shadows, size of face (e.g., number of pixels), face pose (frontal vs. sideways), face symmetry, skin tone pixels and ratio, face occlusions, open eyes, face edge strength, etc., to determine a best shot.

For example, a larger face size generally indicates a more recognizable image. In one embodiment, an image size for best recognition should be a certain threshold size, such as 640×480 pixels, and/or a minimum face height, such as 48 pixels. In addition, a number and/or percentage of pixels that include skin tone colors compared to the overall image is another indication of how recognizable the face may be—a larger number of skin tone pixels generally indicates fewer occlusions covering parts of the face image. Further, face symmetry may be analyzed to determine whether the image captured is from a frontal view, or from a side view. Generally, a frontal view of a face is more recognizable than a side view. Face edge strength, or sharpness of the image, can be used to determine whether the image is likely in focus and/or blurred. In-focus, and un-blurred shots are more likely to be recognizable.

A best shot may be a single best shot image, or a collection of the best shots (e.g. a collection of best shots may include the best N overall shots, or the best single shot from N different categories, such as best focus, largest size, etc.).

A best shot can be determined for each face target captured at a particular time and location, such as a choke point 110 at a facility 100. The choke point can be any point where all, or nearly all people desired to be detected will pass through, such as an entrance to a building.

A best shot detection algorithm determines which actual face image is the clearest and most easily recognizable one. It may account for the different criteria discussed above. For example, each of the above categories can be ranked for each face snapshot and weighted based on importance, and an algorithm can be applied based on the rankings and weights to determine which actual face image is the best, most recognizable one.

For each frame when an actual face image is captured, the face image can be compared to face images captured contemporaneously with that face image (i.e., a series of consecutive face images captured for consecutive frames), and/or also to face images existing in storage, to determine if it is a best shot for a particular target. The comparison may include giving each face image a measure or rating (e.g., a numerical score) based on some of the above-described criteria, and comparing the ratings between two images. For example, if a series of consecutive face images is collected by a camera for a set of consecutive frames, in one embodiment, each image can be given a rating, and then the image with the highest rating can be compared to a rating of a best shot stored for that face target on the system. If the highest rated image has a higher rating than the best shot previously stored, then it can be selected to replace the previous best shot. Alternatively, each face image received at each frame can have its rating compared to a previously stored best shot. If a first face image of a series of consecutive images has a higher rating than the previously stored best shot, it can replace the previous best shot. A subsequently received face image of the series of the consecutive images can then be compared to the newly stored first face image.

In one embodiment, the best single shot is stored, for example, in a best shot database at a central computer at the facility, and the other shots of a series of consecutive shots initially stored in a temporary memory are then deleted. This helps reduce the amount of storage required. The best shot image can also be cropped to get rid of extraneous data in order to reduce the storage size of the face image. However, the cropping need not be performed, and other face images need not be deleted, and can be stored in a backup or other storage. In some embodiments, a group of best face images for each camera (e.g., a plurality of snapshots for each person) can be maintained, for more accurate face recognition. For example, two shots can be stored at the choke point when a person enters a facility—one frontal view and one side view—to provide more comprehensive data on the person's appearance. A description of how these best shots can be used to enhance tracking is described further below.

The examples above are described mostly with respect to face tracking by a single image capture device. However, in another embodiment, the face tracking and best shot detection described herein may be performed for images received from a group of image capture devices.

IV. Using Face Detection/Tracking, Best Shot Detection, and Object Tracking to Enhance Human Tracking and Other Applications As described above, in one embodiment, metadata about objects being tracked, such as people, are stored along with the tracking information. For example, a log may be created that indicates information about a particular tracked person. The log may indicate, for example, temporal attributes and physical attributes. For example, if a person wearing a red jacket enters and walks through a store, a series of entries may be stored in the log:

TABLE 1

| Time/Date | Object | Attributes | Action |
|---|---|---|---|
| Jan. 1, 2012 12:35 pm | person | red jacket | enters store |
| Jan. 1, 2012 12:36 pm | person | red jacket | enters area 114 |
| Jan. 1, 2012 12:39 pm | person | red jacket | lingers at shelf X in |

TABLE 1-continued

| Time/Date | Object | Attributes | Action |
|---|---|---|---|
| Jan. 1, 2012 12:42 pm | person | red jacket | area 114 leaves area 114 |
| Jan. 1, 2012 12:42 pm | person | red jacket | enters area 112 |

Of course, this is only one simple example, and other details can be included in the log, such as various other attributes that can be used to identify the person, additional actions, etc. Tracking may be performed using known tracking algorithms, such as described in the '923 patent. However, in certain cases, tracking may fail. For example, if the person takes off the jacket, or is temporarily occluded by another person, the person being tracked may be inadvertently switched by the tracking system with another nearby person who perhaps is also wearing a red jacket or who is walking next to the person being tracked.

To help avoid these problems, a face image may be included in the log of information. In one embodiment, only a single face image, such as a single best shot, is included in the log. For example, in one embodiment, when a person passes through a choke point, a best face image during the entry is stored in association with tracking information for that person. In addition, an identifier can be associated with that person (e.g., the object can be identified as "person 1"). The best face image may therefore serve as an index for that person. An example of the log above, but including a face image may be as follows:

TABLE 2

| Time/Date | Object | Attributes | Action | Image |
|---|---|---|---|---|
| Jan. 1, 2012 12:35 pm | person 1 | red jacket | enters store | ☺ |
| Jan. 1, 2012 12:36 pm | person 1 | red jacket | enters area 114 | confirm image |
| Jan. 1, 2012 12:39 pm | person 1 | red jacket | lingers at shelf X in area 114 | |
| Jan. 1, 2012 12:42 pm | person 1 | red jacket | leaves area 114 | |
| Jan. 1, 2012 12:42 pm | person 1 | red jacket | enters area 112 | confirm image |

As discussed above, the actual image may be stored, and additional metadata about the image that can be used to identify the person can also be stored. In addition, as shown in Table 2 above, to assist in and improve tracking, at various times and locations, when a person's face image is captured by an image capture device (e.g., 124 detecting a face in area 114, or 122 detecting a face in area 112), the tracking system can determine if the face corresponds in location to a tracked object, such as a person (e.g., person 1). For example, in one embodiment, the spatial location of a face image for a target and the spatial location for an actual or expected location of an object being tracked as the target are compared to determine if they match the profile of a human shape and human face. If so, the captured image can be compared to the face stored in the tracking log. The comparison can be done using known face recognition methods. If the faces are determined to match, then the tracking system can log a "confirm image" entry in the log, which serves to confirm that the person initially tracked is still the same person being tracked. If the faces do not match, then an error can be logged.

In certain embodiments such as described above where an error is logged (e.g., because a person being tracked was lost and possibly confused with someone else), the system can log the error. Then, the next time that person's face is recognized by an image capture device in the facility, a new log entry for that person may be stored. For example, if the last entry in the above log is a failed match instead of a confirmed image, the log entries for person 1 may appear as follows:

TABLE 3

| Time/Date | Object | Attributes | Action | Image |
|---|---|---|---|---|
| Jan. 1, 2012 12:35 pm | person 1 | red jacket | enters store | ☺ |
| Jan. 1, 2012 12:36 pm | person 1 | red jacket | enters area 114 | confirm image |
| Jan. 1, 2012 12:39 pm | person 1 | red jacket | lingers at shelf X in area 114 | |
| Jan. 1, 2012 12:42 pm | person 1 | red jacket | leaves area 114 | |
| Jan. 1, 2012 12:42 pm | person 1 | red jacket | enters area 112 | fail confirm |
| Jan. 1, 2012 12:42 pm | person 1 | red jacket | tracking lost | |
| Jan. 1, 2012 12:55 pm | person 1 | red jacket | enters area 116 | ☺ |

As shown in Table 3, at 12:42, a face image of a person in a red jacket who was being tracked as person 1 is detected, but when the face image is compared to person 1's stored face image, the comparison does not match. As a result, the system logs a "fail confirm," indicating that the tracking of person 1 is no longer accurate, and logs a "tracking lost" entry. Later, if person 1 is again discovered by face detection and recognition at the facility, tracking of person 1 can begin again (e.g., as shown in the 12:55 p.m. entry in Table 3). The actual entries in the log, and the format of the log itself are exemplary only, and are used herein to help illustrate the general concepts of the disclosed embodiments. As such, other log formats and/or entry types can be used.

In addition to using face detection and recognition to link the same person from different camera views, face tracking may also be used to improve the human target tracking in each camera view. Human target to human target occlusion is very common, especially in a crowded scenario. Traditional human tracking methods would often have difficulties to locate the human targets' positions accurately when occlusion exists. Since human face is generally at the upper part of a human target in a scene, and is usually less likely to be fully occluded by other human targets, tracked face location may be used to infer the location of the human target the face belongs to when a body or a portion of a body of the human target is occluded.

As a result of the above-described method, face detection, tracking and recognition can be used by the tracking system to confirm that a tracked person is being correctly tracked and identified. In addition, by associating a face image with the tracked object, and in particular a best shot of the face, it is easier and faster for people reviewing the tracking information and reviewing the video to determine the face of the person being tracked.

For example, if a person in a red jacket enters the store, and then an event occurs, such as the person attempting to steal an item from a shelf by placing it in a pocket, a tracking system without the image information may be able to determine from the log that a person in a red jacket performed a shoplifting action. For example, an alarm may be issued and a screen or printout view of the log may indicate that a person in a red jacket performed a potential shoplifting action at a particular time and location. Then a video from the relevant camera would be reviewed to try to get a better view of the person at the time of the potential theft. In addition, if the person's face is not clear at the moment of the potential theft, additional video would need to be reviewed to correlate the video with the tracked person to determine what the person's face looks like and to better identify the person. On the other hand, if a best image information (e.g., corresponding to a best face image) is stored along with the tracking information, an alarm can be issued that immediately displays the potential shoplifter's face, and a person reviewing the alarm or the tracking log can immediately determine what the potential shoplifter looks like without having to subsequently review any video. As such, where best face images for targets are stored, events can be detected for the targets, and even if a target's face is not visible or recognizable during the occurrence of the event, the best face image can be associated with the event such that a user can easily view a notification of the event along with the best face image. Accordingly, identifying the people that are associated with events in an automatic event detection system can be simplified and achieved more quickly.

The stored image information, such as the best image, can also be used for other purposes, such as for customer identification, or criminal identification. For example, in the scenario above, the potential shoplifter's stored best image can be compared to a driver's license picture database to determine the person's identity. As another example, if a customer signs up to have his or her picture stored at a retailer's database, then that customer can be tracked by the tracking system, and the tracking data can be used for marketing purposes to offer the customer discounts or coupons for certain products that the customer appears to be interested in based on the person's tracking data.

The face recognition and tracking information discussed above can be anonymous. For example, people entering a facility, such as customers entering a store can be identified with a number during their visit to the facility (e.g., "person 1"), as opposed to being identified with their name. Alternatively, however, in certain embodiments people entering a facility can have their personal information, such as name, address, phone number, a photograph, etc., pre-stored in a database. As discussed above, such information can be supplied by customers who wish to receive promotions from a company, and can be used to market products to the customers. The personal information can also be used for security purposes, for example, to reduce theft. In another embodiment, a combination of anonymous and non-anonymous tracking can be performed, such that, for example, certain people being tracked are logged anonymously, and others are logged based on their personal information.

In one embodiment, a target (e.g., person such as person 1) may be tracked in a facility, and tracking data can be stored in a database along with a stored best image. However, if it is determined that no subsequent face image for that target (e.g., with that person ID) has been recognized after a certain period of time, then it may be determined that the person is no longer at the facility. For example, a computer storing the tracking information may not receive tracking information for that person ID for a certain period of time, after which a log entry may be stored to indicate that the person has left the facility. In one embodiment, at that time, the person's tracking information can be deleted, or stored in a backup storage location to be used for later analysis. Alternatively, depending on the storage capabilities of the computer storing the database, the information may simply remain in the database. The period of time for determining if a person has left a facility can vary and depend on the frequency with which images are generally collected at the facility. For example, a computer system can be programmed so that, if each individual's face image is typically captured in a store once per time period (e.g., once every 3 minutes), and a given person's face is not captured for a particular length of time (e.g., over 30 minutes), the system determines and logs that the person has left the facility.

In some cases, a person may be erroneously logged as leaving the facility, or may avoid (inadvertently or purposefully) having his or her best face image collected at the choke point. For example, a person may use a restroom for a long period of time, or may be looking at the ground when entering the facility. In these cases, if a face is detected and verified in the facility, but is not recognized (e.g., does not match with any of the entries in a best image database), a new best image can be stored, and new person ID for a new target can be assigned to that person. From that point on, the person can be recognized and tracked throughout the facility based on the best image.

Figure 4:
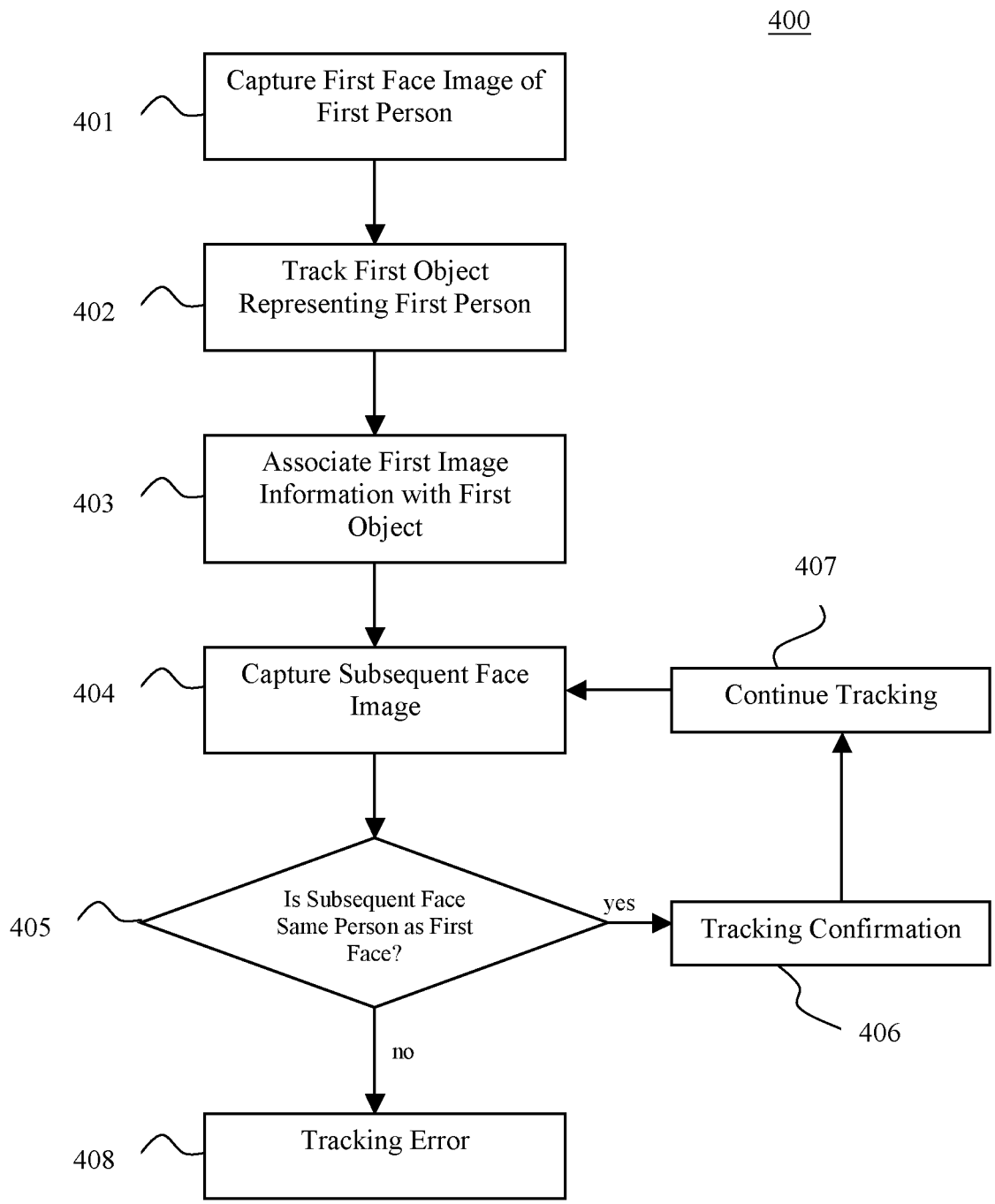
FIG. 4 is a flow chart depicting a further exemplary tracking method, according to one exemplary embodiment.

An exemplary method 400 of tracking a person according to one embodiment is shown in the flow chart depicted in FIG. 4. As shown in FIG. 4, in step 401, a first image of a first person's face is captured. The first person may be, for example, in a facility such as a store, casino, etc. The first image may be captured by an image sensor, such as a camera, may be detected using face detection algorithms, and may be electronically stored along with additional image metadata. For example, the image and/or metadata may be stored in a database on a computer system at the facility.

In step 402, based on one or more videos captured from one or more image sensors (e.g., video cameras), a first object that represents the first person is tracked. For example, tracking of the first object may begin using known tracking techniques. In step 403, the first image information is associated with the first tracked object. Though depicted in a particular order, steps 401-403 may occur in a different order than shown. For example, in one embodiment, steps 401-403 all occur concurrently, such that when an object is identified as a person for tracking purposes, an image of the person's face is captured, stored, and associated with the object as a way to identify the object. In certain embodiments, the image is captured at a choke point and is stored as a best face image from among a series of images captured by an image sensor at the chokepoint.

In step 404, a subsequent face image (e.g., a second face image) is subsequently captured. For example, it may be captured by the same image sensor or a different image sensor (e.g., different camera) in a different location than the image sensor that initially captured the first image of the person's face. The second face image may be of a person believed by the computer system to be the same person being tracked, and may be initially identified as the first person. For example, if the computer system has been tracking an object originally identified as the first person, and a subsequent image of a person's face appears at a location that coincides with a head of the object still being tracked, then the computer system may initially assume that the face belongs to the same person being tracked. In step 405, face recognition is performed to determine whether the second image represents the first person's face. For example, the computer system may automatically perform one or more face recognition programs or algorithms to determine if the two faces represent the same person. The face recognition programs may perform a comparison using the actual images, image metadata, or a combination of the two. If the faces are determined to be the same person (step 405 'yes'), then the computer system confirms the tracked person as the first person (step 406), and continues tracking the first person (step 407). However, if the second face image is determined to represent a different person from the first person (step 405 'no'), then a tracking error may have occurred (step 408). As a result, the error may be logged, for example, as discussed previously, and tracking of the first person may at least temporarily end.

The embodiments described above can be used for different purposes. For example, they can be used at stores to track customers, at casinos to track patrons, at office entrances, trains, buses, or other transportation facilities for security and traffic flow purposes, etc. In addition, the embodiments and concepts described above may apply to non-human objects, such as, for example, non-human faces.

The disclosed embodiments combine object tracking and face recognition to result in a more accurate and reliable monitoring system. For example, a pure tracking system may confuse certain tracked objects that get very close to each other or that change appearance. A pure face recognition system may not keep track of people's movements between captured images and/or may have inaccurate results in certain situations, such as when faces are occluded. However, the combined system allows face recognition to be used to verify that tracked objects are being correctly tracked throughout a facility, and allows tracking to supplement face detection for situations where people's faces are hidden or occluded from view. In addition, the disclosed face detection, recognition and tracking system can be used for other purposes, such as marketing and security.

What is claimed is:

1. A method comprising:
   using an object tracking process to track an object corresponding to a target during a time period;
   capturing a first face image of the object at a first time during the time period;
   storing the first face image of the object at a computer system, and associating the first face image with the target;
   capturing a second face image at a second time during the time period, the second face image corresponding in space with the tracked object;
   comparing the second face image to the first face image to determine whether the second face image and the first face image correspond to the same target; and
   when the second face image and first face image are determined to not correspond to the same target, logging a tracking error and at least temporarily ending a tracking of the object.

2. The method as claimed in claim 1 wherein the first face image is a best face image captured during the time period, which best face image is automatically determined to be the best face image from a group of images.

3. A system comprising:
   one or more cameras; and
   a computer system including one or more computer readable storage media configured to:
   use an object tracking process to track an object during a time period, the object captured by the one or more cameras;
   store a first face image of the object, the first face image captured by the one or more cameras at a first time during the time period;
   associate the first face image with a target;
   receive a second face image captured by the one or more cameras at a second time during the time period, the second face image corresponding in space with the tracked object;
   compare the second face image to the first face image to determine whether the second face image and the first face image correspond to the same target; and
   when the second face image and first face image are determined to not correspond to the same target, log a tracking error and at least temporarily end a tracking of the object.

4. The system as claimed in claim 3 wherein the first face image is a best face image captured during the time period, which best face image is automatically determined to be the best face image from a group of images.

5. The system as claimed in claim 3, wherein the computer system includes a digital video recorder (DVR).

6. The system as claimed in claim 3, wherein the computer system includes a network video recorder (NVR).

7. The system as claimed in claim 3, wherein the one or more cameras are digital cameras.

8. The system as claimed in claim 3, wherein the object is a person.

9. The system as claimed in claim 3, wherein the logging of the tracking error comprises adding an entry to a series of entries stored within the computer system.

10. The system as claimed in claim 9, wherein each entry of the series of entries includes a date and time stamp.

11. The method as claimed in claim 1, wherein the computer system includes a digital video recorder (DVR).

12. The method as claimed in claim 1, wherein the computer system includes a network video recorder (NVR).

13. The method as claimed in claim 1, wherein the object is a person.

14. The method as claimed in claim 1, wherein the logging of the tracking error comprises adding an entry to a series of entries stored within the computer system.

15. The method as claimed in claim 14, wherein each entry of the series of entries includes a date and time stamp.

* * * * *